(12) United States Patent
Appleby et al.

(10) Patent No.: US 11,638,057 B2
(45) Date of Patent: Apr. 25, 2023

(54) CONTENT DELIVERY

(71) Applicant: BRITISH TELECOMMUNICATIONS PUBLIC LIMITED COMPANY, London (GB)

(72) Inventors: Stephen Appleby, London (GB); Rory Turnbull, London (GB); Timothy Stevens, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/637,376

(22) PCT Filed: Aug. 4, 2020

(86) PCT No.: PCT/EP2020/071911
§ 371 (c)(1),
(2) Date: Feb. 22, 2022

(87) PCT Pub. No.: WO2021/037500
PCT Pub. Date: Mar. 4, 2021

(65) Prior Publication Data
US 2022/0303606 A1   Sep. 22, 2022

(30) Foreign Application Priority Data

Aug. 30, 2019  (EP) .................................... 19194759

(51) Int. Cl.
*H04N 21/266* (2011.01)
*H04N 21/222* (2011.01)
(Continued)

(52) U.S. Cl.
CPC ..... *H04N 21/26616* (2013.01); *H04N 21/222* (2013.01); *H04N 21/2393* (2013.01); *H04N 21/6405* (2013.01); *H04N 21/6408* (2013.01)

(58) Field of Classification Search
None
See application file for complete search history.

(56) References Cited

U.S. PATENT DOCUMENTS 9,160,779 B2  10/2015  Cherian et al.
9,407,968 B2   8/2016  Hao et al.
(Continued)

FOREIGN PATENT DOCUMENTS

EP   2 785 006   10/2014
EP   3 051 769    8/2016
(Continued)

OTHER PUBLICATIONS

The Extended European Search Report dated Nov. 12, 2019, including the European Search Report and the European Search Opinion, in connection with corresponding EP Application No. 19194759.7 (8 pp.).

(Continued)

*Primary Examiner* — Junior O Mendoza
(74) *Attorney, Agent, or Firm* — Nixon & Vanderhye P.C.

(57) ABSTRACT

Described is a method of managing a network for delivering content in a hybrid unicast/multicast network, where content is requested by clients over unicast, but all or some of the content is delivered in part over multicast. A client requests content (in the form of segments) and receive the responses (segments) over unicast via a first proxy. The first proxy measures the time between requests and associated requested segment sizes. These measurements are used to effectively determine a unicast request rate given by the segment size divided by the time between requests. Subsequent requested segments can then be delivered over multicast over a portion of the route to the client using a multicast rate that is set as a function of (for example, 110%

(Continued)

of) the unicast request rate. In general, the multicast path will be from a second proxy to the first proxy.

10 Claims, 4 Drawing Sheets

(51) Int. Cl.
*H04N 21/239* (2011.01)
*H04N 21/6405* (2011.01)
*H04N 21/6408* (2011.01)

(56) References Cited

U.S. PATENT DOCUMENTS

| | | | |
|---|---|---|---|
| 9,641,578 B2 | 5/2017 | Wheelock | |
| 10,205,984 B1* | 2/2019 | Cho | H04N 21/23406 |
| 2015/0081847 A1 | 3/2015 | Hao et al. | |
| 2015/0124581 A1* | 5/2015 | Yeom | H04L 65/611 |
| | | | 370/216 |
| 2016/0294898 A1 | 10/2016 | Wheelock | |

FOREIGN PATENT DOCUMENTS

| | | |
|---|---|---|
| EP | 3 506 573 | 7/2019 |
| WO | 2014/106206 | 7/2014 |
| WO | 2015/155679 | 10/2015 |
| WO | 2016/209266 | 12/2016 |
| WO | 2019/212318 | 11/2019 |

OTHER PUBLICATIONS

GB Search Report dated Feb. 25, 2020, in connection with corresponding GB Application No. 1912502.0 (5 pp.).

The International Search Report and the Written Opinion of the International Searching Authority dated Sep. 10, 2020, in connection with corresponding International Application No. PCT/EP2020/071911 (11 pp.).

International Preliminary Report on Patentability for PCT/EP2020/071911 dated Mar. 10, 2022 (8 pages).

* cited by examiner

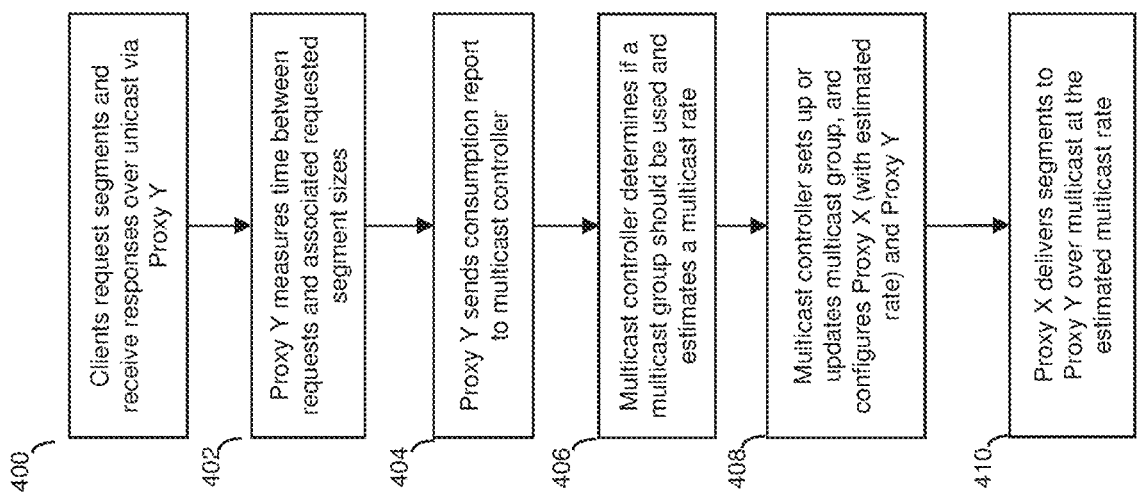

US 11,638,057 B2

CONTENT DELIVERY

This application is the U.S. national phase of International Application No. PCT/EP2020/071911 filed Aug. 4, 2020, which designated the U.S. and claims priority to EP 19194759.7 filed Aug. 30, 2019, the entire contents of each of which are hereby incorporated by reference.

FIELD OF THE INVENTION

This invention relates to the field of content delivery using a combination of unicast and multicast.

BACKGROUND TO THE INVENTION

Increasing volumes of live content are being streamed using HTTP (or HTTPS). Popular live events drive extremely volatile demand, leading to a very high peak-to-mean ratio in traffic volumes. For example, the graph 100 in FIG. 1 shows an example of traffic volumes at gateways close to the edge of a mobile network taken during the Euro 2016 football competition. Plot 102 shows traffic volumes on a day (Wed $15^{th}$ June) without football, and plot 104 shows the traffic volumes the following day (Thu $16^{th}$ June) when there was a football match on (England vs Wales). Both plots show roughly the same traffic volumes through the day, except Plot 104 has a significant additional peak in traffic between around 1400 and 1600 hours, resulting from customers streaming the football match.

This high peak-to-mean ratio poses a particular challenge at the edge of the network, where such peaks can cause a degradation of the users' quality of experience.

Most commonly, content is delivered over the Internet using HTTP (or HTTPS) request/response pairs. Client applications will send an HTTP request to a server and a response will be returned containing the content requested. Such request/responses are unicast in nature.

HTTP(S) can be used for video streaming. Typically, the client will obtain a manifest file which will allow the URLs of individual files containing video segments to be determined. The client will then request these segments in sequence and concatenate them to form a continuous stream for playback. Each video segment may also be available at different bitrates to allow the video rate to adapt to the network throughput. This technique is known as HTTP Adaptive Streaming (HAS).

For users watching the same event, such as a live football match, each client will make their own HTTP requests and get their own HTTP responses, even though a large proportion of the content delivered to them within the HTTP responses will be identical between the clients. This results in very inefficient use of the network.

However, if the access network were able to use multicast for content delivery rather than unicast, then the impact of the live content peaks shown in FIG. 1 could be reduced significantly. Furthermore, the use of multicast in the access network could also significantly reduce the peak demand on the Content Delivery Network servers.

Solutions addressing such a problem already exist, where a multicast path is inserted into an otherwise unicast path between a client and a content server using proxies. Examples of such hybrid solutions include: "IP Multicast Adaptive Bit Rate Architecture Technical Report" OC-TR-IP-MULTI-ARCH-001-161026, 26 Oct. 2016, by Cable Labs; 3GPP specifications, 23.246 (MBMS Architecture and functional description), 26.346 (MBMS Protocols and codecs) and 26.347 (MBMS APIs); and DVB document A176, "Adaptive Media Streaming over IP Multicast", (8 Mar. 2018).

FIG. 2 shows a generalised example of such solutions.

In FIG. 2, there is shown a content server 202 providing content such as video to client devices 204a, 204b and 204c. Multicast Proxy X 206 and three Proxy Ys 208a, 208b, and 208c, are inserted into the otherwise unicast path between content server 202 and the client devices. Proxy X 206 acquires unicast content from the content server 202 and makes it available via multicast. Proxy Y receives the multicast content and can make it available over unicast to any requesting client devices. All the client devices will receive identical responses to their requests for segments, as the same multicast content is received by all the Proxy Ys from Proxy X. The Proxy Ys can be located within the client devices, or separate devices or there may be just a single Proxy Y dependent on set-up.

In such a solution, Proxy X is pre-configured to act as client, and independently makes requests for content segments and dispatches the entire response into the multicast network. Proxy X does this by first requesting a manifest file and then making timely requests for the content segments described within it. In some cases, the content server may require client devices to authenticate themselves with valid credentials before content is served. This is done by supplying Proxy X with valid credentials to be able to access content from content server 202. Thus, authentication is done using credentials configured at Proxy X 206 and not any credentials provided by the individual client devices. Proxy X 206 effectively acts like a pseudo-client.

Furthermore, in such arrangements, it is difficult to determine what rate Proxy X should send the content out at over multicast. In general, prior arrangements have knowledge of or access to the manifests specifying the content and associated rates that are available. In some solutions, manifests are manipulated so that clients only have visibility of a selected rate, which limits all clients to selecting a single rate of content making delivery of that content straightforward. However, such a solution does not properly support HTTP Adaptive Streaming, and as already identified, access to the manifests is required.

Other arrangements suffer from similar problems.

SUMMARY OF THE INVENTION

It is the aim of examples of the present invention to provide an improved content delivery mechanism.

According to one example of the invention, there is provided a method of managing content delivery over a network to a client device, wherein the content comprises a plurality of segments, said method comprising:
i) receiving unicast requests for a plurality of segments from a client device at a first network element;
ii) receiving the requested plurality of segments over unicast at the first network element;
iii) determining the time interval between requests for each given segment;
iv) determining the size of each given segment;
v) estimating a delivery rate as the quotient of the total size of the segments and the total of the time intervals associated with the segments;
vi) receiving unicast requests for further segments from the client device at the first network element;

vii) delivering further segments over multicast to the first network element, wherein the multicast rate used to deliver the further segments is a function of the estimated delivery rate.

The delivery rate may be an average delivery rate calculated over a plurality of segments.

The further segments may be delivered over multicast from a second network element to the first network element. The first and second network elements may be proxy servers.

Determining the size of each segment may be performed by the first network element. The estimated delivery rate may be taken as an average estimated delivery rate from a plurality of clients requesting the same segments.

One or more of the received segments may comprise client specific data and common data applicable to a plurality of clients, determining the size of each given segment may comprise determining the size of the common data, and delivering the further segments over multicast may comprise delivering the common data over multicast using the multicast rate.

The first network element may send the unicast requests for a plurality of segments to a content server.

The content may be media content. The media content may comprise a video sequence.

BRIEF DESCRIPTION OF THE DRAWINGS

For a better understanding of the present invention reference will now be made by way of example only to the accompanying drawings, in which:

FIG. 4 is a flow chart summarising the steps of an example of the invention;

DESCRIPTION OF PREFERRED EMBODIMENTS

The present invention is described herein with reference to particular examples. The invention is not, however, limited to such examples.

Examples of the present invention provide a method of managing a network for delivering content in a hybrid unicast/multicast network, where content is requested by clients over unicast, but all or some of the content is delivered in part over multicast. A client requests content (in the form of segments) and receive the responses (segments) over unicast via a first proxy. The first proxy measures the time between requests and associated requested segment sizes. These measurements are used to effectively determine a unicast request rate given by the segment size divided by the time between requests. Subsequent requested segments can then be delivered over multicast over a portion of the route to the client using a multicast rate that is set as a function of (for example, 110% of) the unicast request rate. In general, the multicast path will be from a second proxy to the first proxy. This allows content to be delivered in a hybrid unicast/multicast arrangement, where the rate used for the multicast path can be set according to the unicast request rates, without any knowledge or access to manifests.

Examples of the present invention can be applied to known unicast/multicast hybrid networks as discussed above, as well as to the invention set out in the Applicant's patent application EP19159748.3, which describes an arrangement referred to as "Multicast Assisted Unicast Delivery" (MAUD). In MAUD, multicast network is used to assist, rather than substituting for, an otherwise unicast path. Content is requested by client devices from a content server over unicast. The responses containing the requested content are separated into two components: a first component containing elements that are specific to individual client devices (for example session specific data), and a second component that is common to all client devices (typically this is the video content being requested). The first component can be delivered over unicast and the second component over multicast, and later recombined to form the original responses. The separation and recombination are handled by suitably configured proxy servers. Examples of the present invention can be used to estimate a rate for delivery of the multicast components between the proxy servers.

Figure 1:
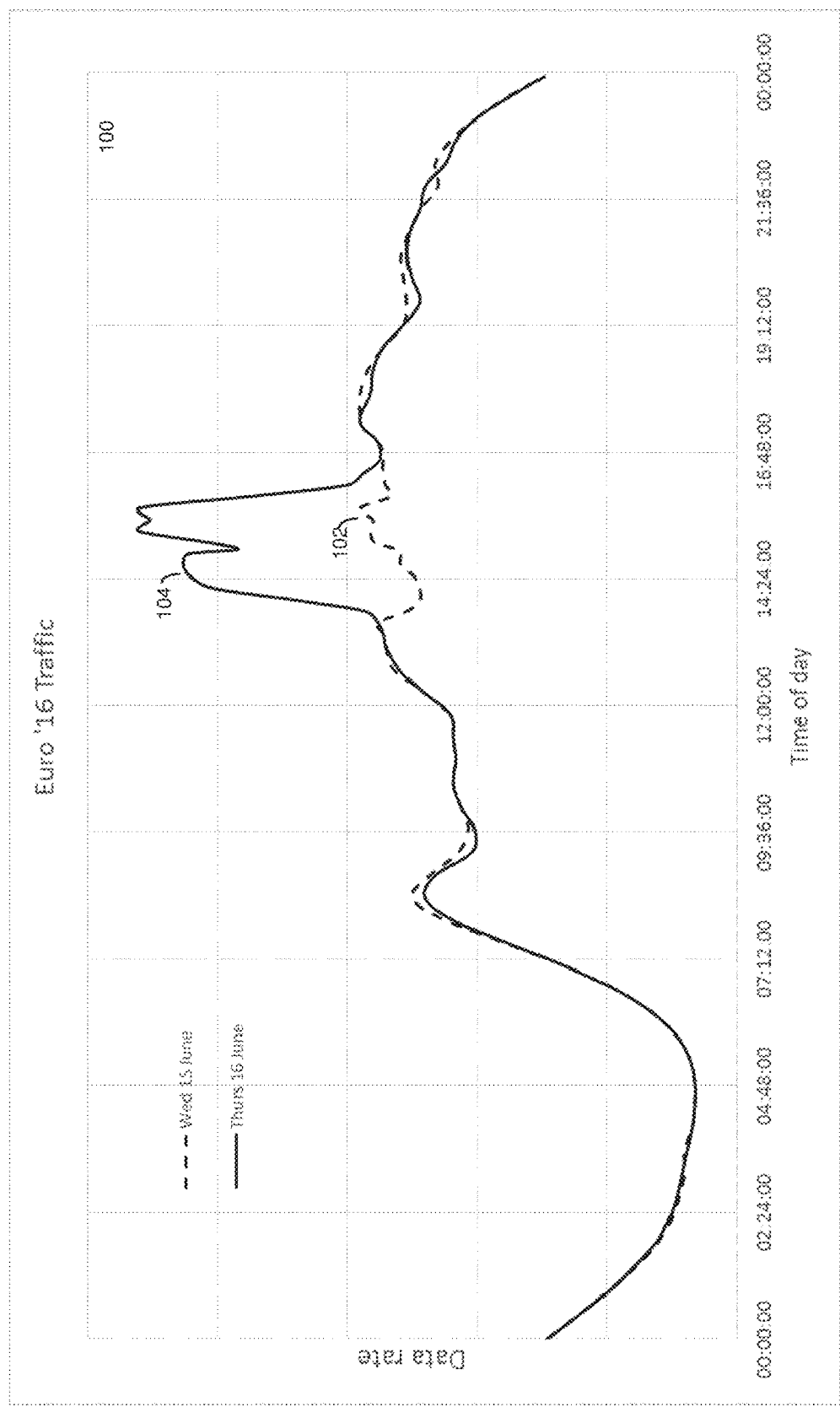
FIG. 1 is a graph showing traffic volume over a network on different days.
Figure 2:
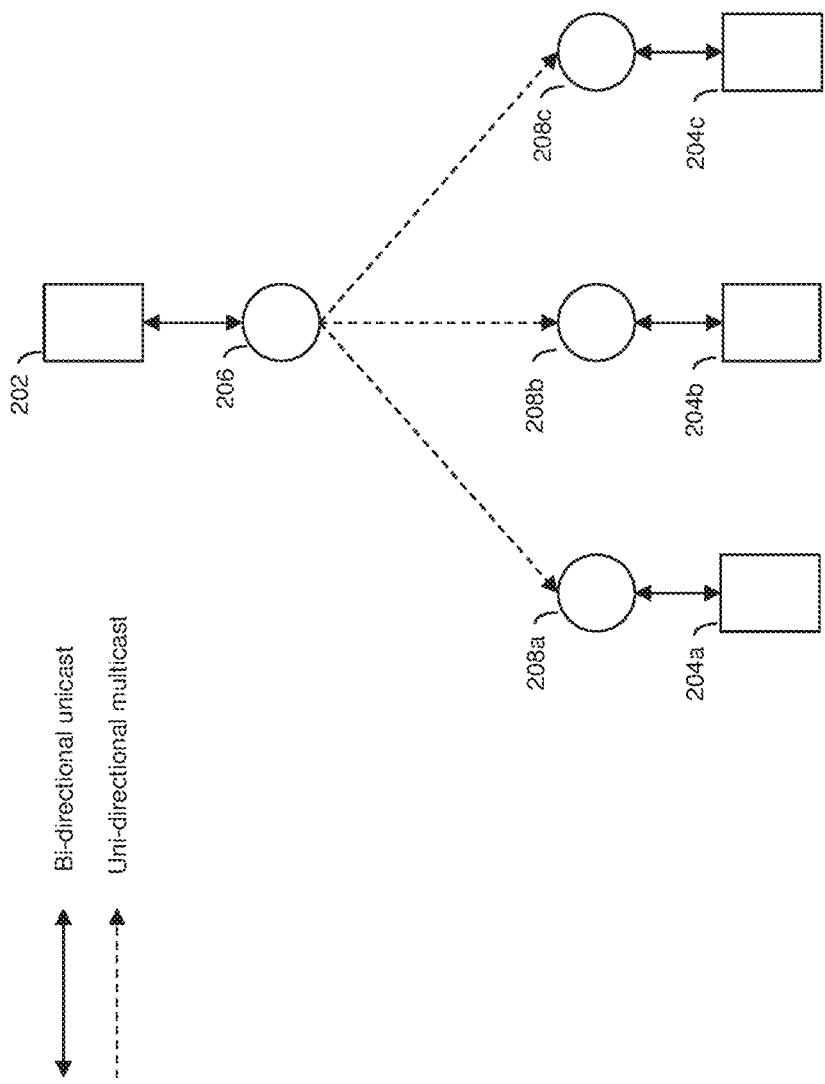
FIG. 2 is a network diagram of a general prior solutions.
Figure 3:
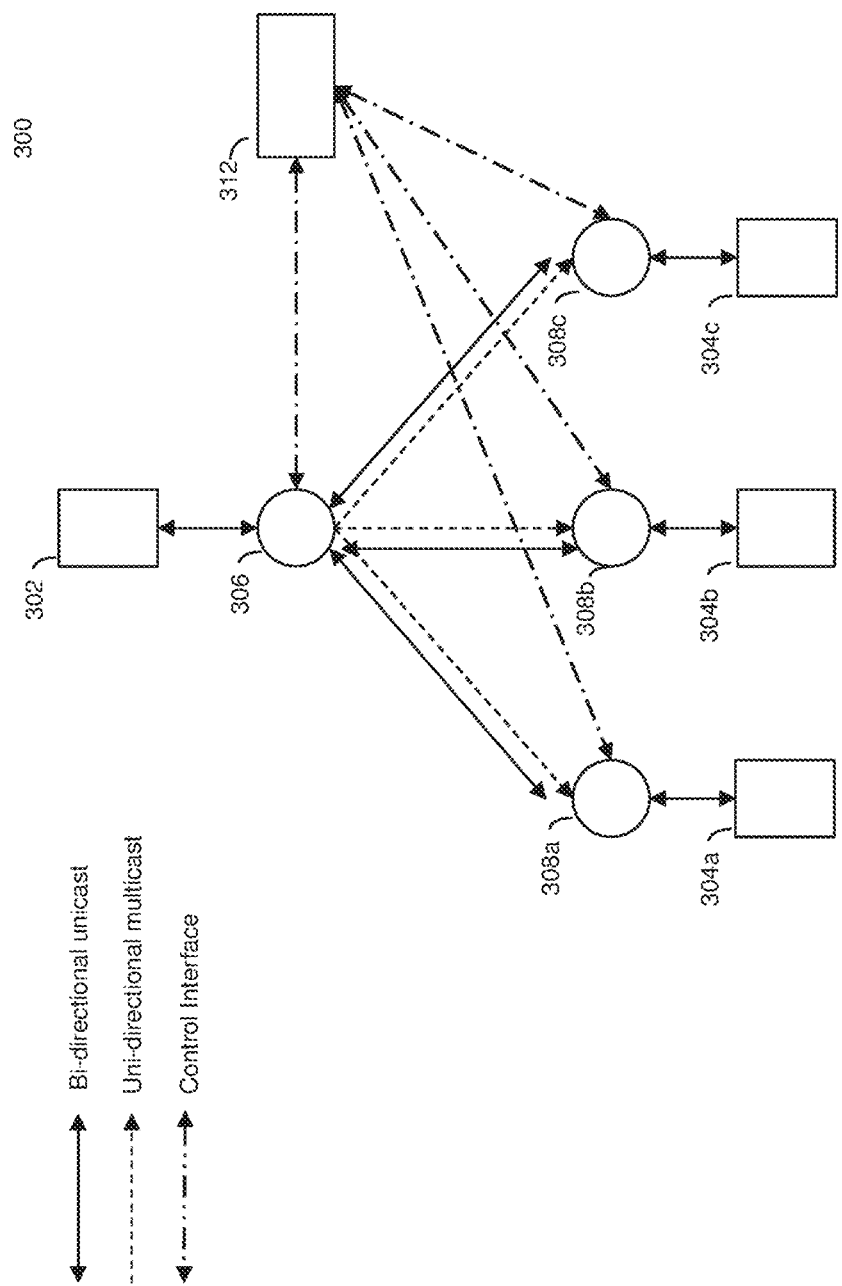
FIG. 3 is a network diagram showing the main components of an example of the present invention.

FIG. 3 shows the main components of a "Multicast Assisted Unicast Delivery" (MAUD) network supporting content delivery. The network 300 comprises a content server 302, a Proxy X 306, Proxy Ys 308a, 308b, and 308c, client devices 304a, 304b and 304c, and a multicast controller 312. The content server 302 provides content such as video to requesting entities, such as the client devices. The content server 302 may be located within a content delivery network (CDN), and there may be more than one content server. Proxy X 306 can communicate with the content server 302 over unicast. Proxy X 306 can also communicate with the Proxy Ys 308a, 308b, and 308c, over both unicast and multicast. The Proxy Ys can be located within the client devices, in separate devices (such as a home gateway), or there may be a single Proxy Y dependent on set-up.

Note, in FIG. 3, bi-directional unicast communication paths are marked with solid lines, uni-directional multicast communication paths are marked with dashed lines, and control interface communications paths are marked with a dot-dash line. The control interface communications paths carry control messaging/commands between the multicast controller 312 and other elements in the network.

The client devices are assumed to be running respective client applications, which are the source of content requests. For simplicity, the term client device from hereon in is used to refer to a client device running a client application. The client devices can make HTTP unicast requests for content held at the content server 302.

The content held at the content server 302 is typically media content (e.g. a TV programme, film or an entire linear TV channel) comprising video sequences encoded according to a suitable standard such as the ITU H.264 standard. The video sequences are stored in the form of sequential temporal segments at the content server 302, where each segment is typically equivalent to 2 to 10 seconds of decoded video. Manifest files are used by clients to identify where segments are located (by a URL in the manifest). Thus, a client device streams a video sequence by using the manifest to determine where to direct sequential unicast requests for each segment in turn as required. Such an arrangement is used in HTTP Adaptive Streaming technologies such as MPEG-DASH and Apple's HLS (HTTP Live Streaming).

The multicast controller 312 (MCC) monitors the operation of Proxy X and the Proxy Ys to determine which traffic should use multicast assistance (MAUD), and controls the proxies accordingly. Thus, in examples of the invention, the client devices may receive some traffic from the content server 302 directly over unicast, and other traffic using MAUD.

Many HTTP requests made by the client devices for content will not make use of MAUD, and are sent directly to the content server.

Other requests for content from a client device that may benefit from MAUD are redirected to, or simply intercepted by, one of the Proxy Ys.

The Proxy Ys can be inserted in the HTTP path using any of a number of well-known techniques, such as using an HTTP redirection from the content server 302. In this case, the content server 302 would be configured such that requests for potentially popular content are not served directly but instead redirected to a suitable Proxy Y. For example, instead of supplying a normal response, the content server 302 could respond with an HTTP status code 307 which indicates a temporary redirect. This invites the client device to make a new request to the new URL supplied by the content server in its response, thus enabling requests to be made to Proxy Y. This technique allows the content server and proxy Y to exist in different domains, which would often be the case.

Other mechanisms to insert proxy Y in the HTTP path include: Proxy Y configured as a transparent proxy (though all requests are intercepted by it, and only works with unencrypted traffic); Proxy Y configured as a forward proxy (where the client device sends its requests directly to Proxy Y by virtue of being explicitly configured to do so); DNS hijacking (where a DNS server is configured to supply the IP address of Proxy Y for domains of interest); and manifest manipulation (where the manifest file is re-written so that requests are made directly to Proxy Y).

FIG. 4 shows a flow chart summarising the steps of a general example of the invention.

Starting at step 400, one or more client devices make requests for segments of content, such as a film stored at the content server 302, and receives responses (the segments) over unicast via Proxy Y. For example, client device 304a makes HTTP GET requests, which are unicast in nature, directed to segments of content. Each HTTP GET request includes the URL of where that segment can be retrieved from. The URLs are found in the manifest file associated with the content. The requests are received by Proxy Y 308a, and forwarded to the content server 302.

The content server 302 responds with HTTP responses, each containing a requested segment. The HTP response is also effectively a unicast response. The responses are received by Proxy Y 308a and sent to the client device 304a. The received segments can then be viewed by the client device 304a.

The client device 304a can continue to request and receive segments according to step 400 until streaming of that content is complete. However, in examples of the invention, the multicast controller 312 determines whether a multicast group should be used to deliver subsequent segments, and also the rate at which those segments should be sent at over multicast.

Thus, in step 402, Proxy Y 308a measures the time interval to between requests for segments $S_n$ received from the client device 304a in step 400. For example, if segment $S_0$ is requested at t=0s, $S_1$ at t=6s, $S_2$ at t=11s, $S_3$ at t=18s, then the time intervals between requests for segment $S_1$ is $t_1$=6s, for segment $S_2$ is t=5s, and for segment $S_3$ is t=7s.

Proxy Y 308a also measures the corresponding sizes of the segments Sn it receives. For example, segment $S_1$ might be 6 MB, S2 5 MB, and S3 7 MB.

In step 404, Proxy Y 308a sends a consumption report with the interval and segment size data to the multicast controller 312, together with data relating to the HTTP request/response pairs that are passing through the proxy e.g. the URL of each HTTP request. The consumption report can be sent to the multicast controller 312 at intervals, either time interval or after a certain number of segments have been requested/received.

Now, the HTTP requests and response describes so far are all unicast in nature. However, it should be noted that requests for the same content might be made by other client devices. This is typical during for example a live football match. Proxy Y 308a and other Proxy Ys (308b or 308c) as appropriate send consumption reports to the multicast controller 312 for their respective client devices, so that the multicast controller 312 can determine whether or not to use multicast to help deliver further content.

In step 406, the multicast controller 312 uses the received reports to determine whether the HTTP requests reported from a given population of Proxy Ys justifies the use of multicast for their responses. Such a population of Proxy Ys is referred to as a 'cohort'. Assuming certain conditions are satisfied (for example, greater than a certain number of client devices requesting the same content), the multicast controller 312 will configure Proxy X and any relevant Proxy Ys (that is the cohort) for multicast assisted delivery by setting up a suitable multicast group. Once the multicast group has been set up, content (requested segments) are sent back to Proxy Y from Proxy X using multicast.

The multicast controller 312 uses the interval and segment size data to estimate a unicast request rate given by the quotient of the segment size and the segment interval:

$$Rate_{unicast} = \frac{S_n}{t_n} \qquad (1)$$

In practice, the estimated rate is likely to be an average rate taken over a number of segments (for example the most recent 3 segments). The average rate can be represented as:

$$Rate\_Av_{unicast} = \Sigma_i^j S_n / \Sigma_i^j t_n \qquad (2)$$

Where i and j are the first and final segments in the range of segments being considered.

This estimated rate can then be used as the basis for setting the multicast rate. The multicast rate is effectively set as a function of the estimated rate from equation (1) or (2):

$$Rate_{multicast} = Fn(Rate_{unicast}) \qquad (3)$$

For example, the multicast rate might be set at 110% of the estimated unicast rate.

It should be further noted that the unicast rate from equations (1) and (2) might be averaged over a number of different client devices requesting the same content/segments.

In step 408, the multicast controller 312 can add Proxy Y 308a to a cohort by sending Proxy Y 308a instructions to set up an HTTP request route, whereby requests matching a particular URL path/pattern/string are directed to Proxy X 306. The multicast controller 312 also sends Proxy Y 308a instructions to provision a multicast listener. The instructions tell Proxy Y 308a to prepare to receive multicast. The multicast listener causes Proxy Y to issue an IGMP join command to a multicast address specified by the multicast controller.

To allow the Proxy X 306 to use multicast for the return path for responses to requests that meet the match pattern set up for Proxy Y 306, the multicast controller 312 configures Proxy X 306 to use multicast for certain responses sent by the content server. For example, the instruction could be to only use multicast assistance for responses that contain video files or MIME types such as "video/mp4" or "video/MP2T", so that only responses containing video traffic are sent over multicast. In an alternative example, responses can be selected based on specific Etags or a range of Etags. Etags (Entity Tags) are part of the HTTP 1.1 specification and are used to uniquely identify response payloads.

Proxy X 306 and one or more of the Proxy Ys are now configured for respectively sending and receiving content over multicast.

The multicast controller 312 also sends Proxy X 306 instructions to use the multicast rate determined from equation (3) to send data over multicast from Proxy X 306 to any Proxy Ys. As discussed above, the multicast rate that is used can be set can fractionally higher than the underlying estimated unicast rate, for example 110% of the estimated unicast rate.

This estimated multicast rate is the rate at which content segments need to be sent at to try and ensure that data is delivered fast enough to meet the demands of the requesting client device(s). Otherwise there is a risk that the client device will request segments at a rate that is faster than the multicast rate.

In step 410, HTTP GET requests are sent by client device 304a and received at Proxy Y 308a for further segments. Proxy Y 308a checks to see if the requests match the pattern set out earlier. A match effectively means that the request should be fulfilled over multicast. Assuming they do match, then Proxy Y 308a sends the HTTP GET requests onto Proxy X 306 (instead of to the content server 302 directly).

Proxy X 306 sends the received HTTP GET requests to the content server 302, which responds with the requested segments in HTTP responses to Proxy X 306. Proxy X 306 then sends these segments over multicast (assuming the file conditions are met as described above) at the estimated multicast rate set out by equation (3)

Proxy Y 308a is configured to receive multicast, and thus will receive the segments sent over multicast from Proxy X 306. The received segments are then sent over unicast from Proxy Y 308a to the client device 304a.

It should be noted that examples of the above invention of setting the multicast rate can be applied to other hybrid unicast/multicast arrangements. For example, the Applicant's European patent application EP19159748.3 sets out an arrangement referred to as "Multicast Assisted Unicast Delivery" (MAUD). Content is requested by client devices from a content server over unicast. The responses containing the requested content are separated into two components: a first component containing elements that are specific to individual client devices (for example session specific data), and a second component that is common to all client devices (typically this is the video content being requested). The first component can be delivered over unicast and the second component over multicast, and later recombined to form the original responses. The component delivered over multicast can be delivered at a rate set according to examples of the invention as described above, where the size of a given segment is the determined as the size of the common data, and the further segments delivered over multicast comprises the common data. Typically, the client or session specific data is the segment header, and the common component is the payload portion of the segment.

Note, the term "unicast" used in the described examples is intended to cover point-to-point communications services in general. Similarly, the term "multicast" is intended to cover point-to-multipoint services, including broadcast services.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing content delivery over a network to a client device, wherein the content comprises a plurality of segments, said method comprising:
   i) receiving unicast requests for a plurality of segments from a client device at a first network element;
   ii) receiving the requested plurality of segments over unicast at the first network element;
   iii) determining the time interval between requests for each given segment;
   iv) determining the size of each given segment;
   v) estimating a delivery rate as the quotient of the total size of the segments and the total of the time intervals associated with the segments;
   vi) receiving unicast requests for further segments from the client device at the first network element;
   vii) delivering further segments over multicast to the first network element, wherein the multicast rate used to deliver the further segments is a function of the estimated delivery rate.

2. A method as claimed in claim 1, wherein the delivery rate is an average delivery rate.

3. A method as claimed in claim 1, wherein the further segments are delivered over multicast from a second network element to the first network element.

4. A method as claimed in claim 3, wherein the first and second network elements are proxy servers.

5. A method according to claim 1, wherein determining the size of each segment is performed by the first network element.

6. A method according to claim 1, wherein the estimated delivery rate is taken as an average estimated delivery rate from a plurality of clients requesting the same segments.

7. A method according to claim 1, wherein one or more of the received segments comprises client specific data and common data applicable to a plurality of clients, determining the size of each given segment comprises determining the size of the common data, and delivering the further segments over multicast comprises delivering the common data over multicast using the multicast rate.

8. A method according to claim 1, wherein the first network element sends the unicast requests for a plurality of segments to a content server.

9. A method according to claim 1, wherein the content is media content.

10. A method according to claim 9, wherein the media content comprises a video sequence.

* * * * *